(12) United States Patent
Greshes

(10) Patent No.: US 6,451,227 B1
(45) Date of Patent: Sep. 17, 2002

(54) METHOD FOR MAKING EYE GLASS LENSES AND PREFORMS FOR USE THEREIN

(75) Inventor: Martin Greshes, Deer Park, NY (US)

(73) Assignee: Chrysalis Development Co., LLC, Deer Park, NY (US)

( * ) Notice: Subject to any disclaimer, the term of this patent is extended or adjusted under 35 U.S.C. 154(b) by 0 days.

(21) Appl. No.: 09/577,205

(22) Filed: May 23, 2000

(51) Int. Cl.[7] ............................................. B29D 11/00

(52) U.S. Cl. ........................................ 264/2.4; 264/2.7

(58) Field of Search ..................... 264/1.1, 2.4, 2.7, 264/322, 296; 425/808, 407

(56) References Cited

U.S. PATENT DOCUMENTS

| | | | | |
|---|---|---|---|---|
| 2,304,663 A | * | 12/1942 | Smith et al. .................. | 264/2.4 |
| 5,623,039 A | * | 4/1997 | Hatke et al. | |
| 5,630,967 A | * | 5/1997 | Greshes ....................... | 264/2.4 |

* cited by examiner

Primary Examiner—Mathieu D. Vargot
(74) Attorney, Agent, or Firm—James A. Quinton

(57) ABSTRACT

A method for forming a thermoplastic preform into a lens by compression molding between a pair of molds is provided. In another aspect of the invention a set of novel preforms made from a thermoplastic material is provided. The preforms have different radii of curvature. Preferably each different curvature preform comes in different weights desirably two or three different weights. A series of mating concave and convex mold halves are provided for use with the preforms. According to the invention a limited number of concave mold halves are provided. A wide range of single vision and multifocal lenses can be supplied from three (3) to six (6) base curve concave molds halves having different radii of curvatures. According to the invention a first concave mold half with a radius of curvature of less than two (2) diopters is provided. Each successive concave mold half has a radius of curvature of from one (1) to three (3) diopters greater than the previous mold half in the series. Thermoplastic preforms are associated with the different concave mold halves. Each preform has a convex side for placement in a concave mold half and a flat side or substantial flat side or a concave side curve for engagement with a convex mold half. The convex side of the preform has a radius of curvature in diopters of 1 to 5 diopters greater than the radius of curvature of the concave mold half. Desirably the radius of curvature of the preform is 2 to 4 diopters greater than the radius of curvature of the concave mold desirably about 3 diopters or above and preferably 3 diopters greater than that of the concave mold. A convex mold half is provided, for mating with the concave mold to complete the finished lens having a desired magnification strength.

10 Claims, 10 Drawing Sheets

WEIGHTS OF PREFORMS FOR LABORATORY USE

+ ON - COMPOUNDS:

| POWER | -0.25 | -0.50 | -0.75 | -1.00 | -1.25 | -1.50 | -1.75 | -2.00 | |
|---|---|---|---|---|---|---|---|---|---|
| PLANO | | | | | | | | | 5 BASE CONCAVE MOLD |
| +0.25 | RANGE OF WEIGHTS 10.6 TO 12.5 GRAMS | | | | RANGE OF WEIGHTS 12.8 TO 15.0 GRAMS | | | | |
| +0.50 | | | | | | | | | |
| +0.75 | | | | | | | | | |
| +1.00 | | | | | | | | | |
| +1.25 | | | | | | | | | |
| +1.50 | RANGE OF WEIGHTS 15.1 TO 17.4 GRAMS | | | | | RANGE OF WEIGHTS 17.6 TO 20.0 GRAMS | | | |
| +1.75 | | | | | | | | | |
| +2.00 | | | | | | | | | |
| +2.25 | | | | RANGE OF WEIGHTS 18.6 TO 21.2 GRAMS | | | | | 7 BASE CONCAVE MOLD |
| +2.50 | | | | | | | | | |
| +2.75 | | | | | | | | | |
| +3.00 | | | | | | | | | |
| +3.25 | RANGE OF WEIGHTS 20.4 TO 23.6 GRAMS | | | | | | | | |
| +3.50 | | | | | | | | | |
| +3.75 | | | | | RANGE OF WEIGHTS 23.8 TO 27.0 GRAMS | | | | |
| +4.00 | | | | | | | | | |

-ON - COMPOUNDS:

| POWER | -0.25 | -0.50 | -0.75 | -1.00 | -1.25 | -1.50 | -1.75 | -2.00 | |
|---|---|---|---|---|---|---|---|---|---|
| -0.25 | | | | | | | | | 5 BASE CONCAVE MOLD |
| -0.50 | | | RANGE OF WEIGHTS 12.0 TO 14.0 GRAMS | | | | | | |
| -0.75 | | | | | | | | | |
| -1.00 | | | | | | | | | |
| -1.25 | | | | | | | | | |
| -1.50 | RANGE OF WEIGHTS 14.1 TO 16.2 GRAMS | | | | | RANGE OF WEIGHTS 16.1 TO 19.0 GRAMS | | | |
| -1.75 | | | | | | | | | |
| -2.00 | | | | | | | | | |
| -2.25 | | | RANGE OF WEIGHTS 16.7 TO 19.0 GRAMS | | | | | | 3 BASE CONCAVE MOLD |
| -2.50 | | | | | | | | | |
| -2.75 | | | | | | | | | |
| -3.00 | | | | | RANGE OF WEIGHTS 19.2 TO 21.6 GRAMS | | | | |
| -3.25 | RANGE OF WEIGHTS 19.2 TO 21.0 GRAMS | | | | | | | | |
| -3.50 | | | | | | | RANGE OF WEIGHTS 21.8 TO 24.8 GRAMS | | |
| -3.75 | | | | | | | | | |
| -4.00 | | | | | | | | | |
| -4.25 | | | | | | | | | 1 BASE CONCAVE MOLD |
| -4.50 | | RANGE OF WEIGHTS 20.0 TO 24.0 GRAMS | | | | | | | |
| -4.75 | | | | | RANGE OF WEIGHTS 23.0 TO 26.0 GRAMS | | | | |
| -5.00 | | | | | | | | | |
| -5.25 | | | RANGE OF WEIGHTS 23.0 TO 25.0 GRAMS | | | | | | |
| -5.50 | RANGE OF WEIGHTS 21.0 TO 25.0 GRAMS | | | | | | | | |
| -5.75 | | | | | | RANGE OF WEIGHTS 24.0 TO 27.0 GRAMS | | | |
| -6.00 | | | | | | | | | |

FIG. 10A

PLUS(+) ON MINUS(−) COMPOUNDS:

| POWER | −0.25 | −0.50 | −0.75 | −1.00 | −1.25 | −1.50 | −1.75 | −2.00 | |
|---|---|---|---|---|---|---|---|---|---|
| PLANO | | | | | | | | | I |
| +0.25 | | | | | | | | | |
| +0.50 | | | | 12g. & 16g. | | | | | |
| +0.75 | | | | | | | | | |
| +1.00 | | | | CX: 8.0 diopters | | | | | |
| +1.25 | | | | CC: plano (0.0 diopters) | | | | | |
| +1.50 | | | | | | | | | |
| +1.75 | | | | | | | | | |
| +2.00 | | | | | | | | | II |
| +2.25 | | | | | | | | | |
| +2.50 | | | | 17g. & 23g. | | | | | |
| +2.75 | | | | | | | | | |
| +3.00 | | | | CX: 10.0 diopters | | | | | |
| +3.25 | | | | CC: plano (0.0 diopters) | | | | | |
| +3.50 | | | | | | | | | |
| +3.75 | | | | | | | | | |
| +4.00 | | | | | | | | | |

MINUS(−) ON MINUS(−) COMPOUNDS:

| POWER | −0.25 | −0.50 | −0.75 | −1.00 | −1.25 | −1.50 | −1.75 | −2.00 | |
|---|---|---|---|---|---|---|---|---|---|
| −0.25 | | | | | | | | | I |
| −0.50 | | | | 12g. & 16g. | | | | | |
| −0.75 | | | | | | | | | |
| −1.00 | | | | | | | | | |
| −1.25 | | | | CX: 8.0 diopters | | | | | |
| −1.50 | | | | CC: plano (0.0 diopters) | | | | | |
| −1.75 | | | | | | | | | |
| −2.00 | | | | | | | | | II |
| −2.25 | | | | | | | | | |
| −2.50 | | | | 19g. & 23g. | | | | | |
| −2.75 | | | | | | | | | |
| −3.00 | | | | | | | | | |
| −3.25 | | | | CX: 6.0 diopters | | | | | |
| −3.50 | | | | CC: plano (0.0 diopters) | | | | | |
| −3.75 | | | | | | | | | |
| −4.00 | | | | | | | | | IV |
| −4.25 | | | | | | | | | |
| −4.50 | | | | 22g. & 25g. | | | | | |
| −4.75 | | | | | | | | | |
| −5.00 | | | | | | | | | |
| −5.25 | | | | CX: 4.0 diopters | | | | | |
| −5.50 | | | | CC: plano (0.0 diopters) | | | | | |
| −5.75 | | | | | | | | | |
| −6.00 | | | | | | | | | |

FIG. 10B

NOMINAL CONVEX MOLD CURVES (IN DIOPTERS)

+ON – COMPOUNDS:

| POWER | −0.25 | −0.50 | −0.75 | −1.00 | −1.25 | −1.50 | −1.75 | −2.00 | |
|---|---|---|---|---|---|---|---|---|---|
| PLANO | 5.00 −0.25 | 5.00 −0.50 | 5.00 −0.75 | 5.00 −1.00 | 5.00 −1.25 | 5.00 −1.50 | 5.00 −1.75 | 5.00 −2.00 | |
| +0.25 | 4.75 −0.25 | 4.75 −0.50 | 4.75 −0.75 | 4.75 −1.00 | 4.75 −1.25 | 4.75 −1.50 | 4.75 −1.75 | 4.75 −2.00 | |
| +0.50 | 4.50 −0.25 | 4.50 −0.50 | 4.50 −0.75 | 4.50 −1.00 | 4.50 −1.25 | 4.50 −1.50 | 4.50 −1.75 | 4.50 −2.00 | 5 BASE CONCAVE MOLD |
| +0.75 | 4.25 −0.25 | 4.25 −0.50 | 4.25 −0.75 | 4.25 −1.00 | 4.25 −1.25 | 4.25 −1.50 | 4.25 −1.75 | 4.25 −2.00 | |
| +1.00 | 4.00 −0.25 | THESE 64 MOLDS REPEAT THE 64 MOLDS LISTED ABOVE ||||||| 4.00 −2.00 | |
| +1.25 | 3.75 −0.25 | 3.75 −0.50 | 3.75 −0.75 | 3.75 −1.00 | 3.75 −1.25 | 3.75 −1.50 | 3.75 −1.75 | 3.75 −2.00 | |
| +1.50 | 3.50 −0.25 | 3.50 −0.50 | 3.50 −0.75 | 3.50 −1.00 | 3.50 −1.25 | 3.50 −1.50 | 3.50 −1.75 | 3.50 −2.00 | |
| +1.75 | 3.25 −0.25 | 3.25 −0.50 | 3.25 −0.75 | 3.25 −1.00 | 3.25 −1.25 | 3.25 −1.50 | 3.25 −1.75 | 3.25 −2.00 | |
| +2.00 | 3.00 −0.25 | 3.00 −0.50 | 3.00 −0.75 | 3.00 −1.00 | 3.00 −1.25 | 3.00 −1.50 | 3.00 −1.75 | 3.00 −2.00 | |
| +2.25 | 4.75 −0.25 | 4.75 −0.50 | 4.75 −0.75 | 4.75 −1.00 | 4.75 −1.25 | 4.75 −1.50 | 4.75 −1.75 | 4.75 −2.00 | |
| +2.50 | 4.50 −0.25 | 4.50 −0.50 | 4.50 −0.75 | 4.50 −1.00 | 4.50 −1.25 | 4.50 −1.50 | 4.50 −1.75 | 4.50 −2.00 | |
| +2.75 | 4.25 −0.25 | 4.25 −0.50 | 4.25 −0.75 | 4.25 −1.00 | 4.25 −1.25 | 4.25 −1.50 | 4.25 −1.75 | 4.25 −2.00 | 7 BASE CONCAVE MOLD |
| +3.00 | 4.00 −0.25 | 4.00 −0.50 | 4.00 −0.75 | 4.00 −1.00 | 4.00 −1.25 | 4.00 −1.50 | 4.00 −1.75 | 4.00 −2.00 | |
| +3.25 | 3.75 −0.25 | 3.75 −0.50 | 3.75 −0.75 | 3.75 −1.00 | 3.75 −1.25 | 3.75 −1.50 | 3.75 −1.75 | 3.75 −2.00 | |
| +3.50 | 3.50 −0.25 | 3.50 −0.50 | 3.50 −0.75 | 3.50 −1.00 | 3.50 −1.25 | 3.50 −1.50 | 3.50 −1.75 | 3.50 −2.00 | |
| +3.75 | 3.25 −0.25 | 3.25 −0.50 | 3.25 −0.75 | 3.25 −1.00 | 3.25 −1.25 | 3.25 −1.50 | 3.25 −1.75 | 3.25 −2.00 | |
| +4.00 | 3.00 −0.25 | 3.00 −0.50 | 3.00 −0.75 | 3.00 −1.00 | 3.00 −1.25 | 3.00 −1.50 | 3.00 −1.75 | 3.00 −2.00 | |

−ON – COMPOUNDS:

| POWER | −0.25 | −0.50 | −0.75 | −1.00 | −1.25 | −1.50 | −1.75 | −2.00 | |
|---|---|---|---|---|---|---|---|---|---|
| −0.25 | 5.25 −0.25 | 5.25 −0.50 | 5.25 −0.75 | 5.25 −1.00 | 5.25 −1.25 | 5.25 −1.50 | 5.25 −1.75 | 5.25 −2.00 | |
| −0.50 | 5.50 −0.25 | 5.50 −0.50 | 5.50 −0.75 | 5.50 −1.00 | 5.50 −1.25 | 5.50 −1.50 | 5.50 −1.75 | 5.50 −2.00 | |
| −0.75 | 5.75 −0.25 | 5.75 −0.50 | 5.75 −0.75 | 5.75 −1.00 | 5.75 −1.25 | 5.75 −1.50 | 5.75 −1.75 | 5.75 −2.00 | 5 BASE CONCAVE MOLD |
| −1.00 | 6.00 −0.25 | 6.00 −0.50 | 6.00 −0.75 | 6.00 −1.00 | 6.00 −1.25 | 6.00 −1.50 | 6.00 −1.75 | 6.00 −2.00 | |
| −1.25 | 6.25 −0.25 | 6.25 −0.50 | 6.25 −0.75 | 6.25 −1.00 | 6.25 −1.25 | 6.25 −1.50 | 6.25 −1.75 | 6.25 −2.00 | |
| −1.50 | 6.50 −0.25 | 6.50 −0.50 | 6.50 −0.75 | 6.50 −1.00 | 6.50 −1.25 | 6.50 −1.50 | 6.50 −1.75 | 6.50 −2.00 | |
| −1.75 | 6.75 −0.25 | 6.75 −0.50 | 6.75 −0.75 | 6.75 −1.00 | 6.75 −1.25 | 6.75 −1.50 | 6.75 −1.75 | 6.75 −2.00 | |
| −2.00 | 7.00 −0.25 | 7.00 −0.50 | 7.00 −0.75 | 7.00 −1.00 | 7.00 −1.25 | 7.00 −1.50 | 7.00 −1.75 | 7.00 −2.00 | |
| −2.25 | 5.25 −0.25 | 5.25 −0.50 | 5.25 −0.75 | 5.25 −1.00 | 5.25 −1.25 | 5.25 −1.50 | 5.25 −1.75 | 5.25 −2.00 | |
| −2.50 | 5.50 −0.25 | 5.50 −0.50 | 5.50 −0.75 | 5.50 −1.00 | 5.50 −1.25 | 5.50 −1.50 | 5.50 −1.75 | 5.50 −2.00 | |
| −2.75 | 5.75 −0.25 | 5.75 −0.50 | 5.75 −0.75 | 5.75 −1.00 | 5.75 −1.25 | 5.75 −1.50 | 5.75 −1.75 | 5.75 −2.00 | |
| −3.00 | 6.00 −0.25 | THESE 64 MOLDS REPEAT THE 64 MOLDS LISTED ABOVE ||||||| 6.00 −2.00 | 3 BASE CONCAVE MOLD |
| −3.25 | 6.25 −0.25 | 6.25 −0.50 | 6.25 −0.75 | 6.25 −1.00 | 6.25 −1.25 | 6.25 −1.50 | 6.25 −1.75 | 6.25 −2.00 | |
| −3.50 | 6.50 −0.25 | 6.50 −0.50 | 6.50 −0.75 | 6.50 −1.00 | 6.50 −1.25 | 6.50 −1.50 | 6.50 −1.75 | 6.50 −2.00 | |
| −3.75 | 6.75 −0.25 | 6.75 −0.50 | 6.75 −0.75 | 6.75 −1.00 | 6.75 −1.25 | 6.75 −1.50 | 6.75 −1.75 | 6.75 −2.00 | |
| −4.00 | 7.00 −0.25 | 7.00 −0.50 | 7.00 −0.75 | 7.00 −1.00 | 7.00 −1.25 | 7.00 −1.50 | 7.00 −1.75 | 7.00 −2.00 | |
| −4.25 | 5.25 −0.25 | 5.25 −0.50 | 5.25 −0.75 | 5.25 −1.00 | 5.25 −1.25 | 5.25 −1.50 | 5.25 −1.75 | 5.25 −2.00 | |
| −4.50 | 5.50 −0.25 | 5.50 −0.50 | 5.50 −0.75 | 5.50 −1.00 | 5.50 −1.25 | 5.50 −1.50 | 5.50 −1.75 | 5.50 −2.00 | |
| −4.75 | 5.75 −0.25 | 5.75 −0.50 | 5.75 −0.75 | 5.75 −1.00 | 5.75 −1.25 | 5.75 −1.50 | 5.75 −1.75 | 5.75 −2.00 | |
| −5.00 | 6.00 −0.25 | THESE 64 MOLDS REPEAT THE 64 MOLDS LISTED ABOVE ||||||| 6.00 −2.00 | 1 BASE CONCAVE MOLD |
| −5.25 | 6.25 −0.25 | 6.25 −0.50 | 6.25 −0.75 | 6.25 −1.00 | 6.25 −1.25 | 6.25 −1.50 | 6.25 −1.75 | 6.25 −2.00 | |
| −5.50 | 6.50 −0.25 | 6.50 −0.50 | 6.50 −0.75 | 6.50 −1.00 | 6.50 −1.25 | 6.50 −1.50 | 6.50 −1.75 | 6.50 −2.00 | |
| −5.75 | 6.75 −0.25 | 6.75 −0.50 | 6.75 −0.75 | 6.75 −1.00 | 6.75 −1.25 | 6.75 −1.50 | 6.75 −1.75 | 6.75 −2.00 | |
| −6.00 | 7.00 −0.25 | 7.00 −0.50 | 7.00 −0.75 | 7.00 −1.00 | 7.00 −1.25 | 7.00 −1.50 | 7.00 −1.75 | 7.00 −2.00 | |

FIG. 10C

NOMINAL CONVEX MOLD CURVES (IN DIOPTERS)

SPHERES PLUS POWERS

| | | | 5 BASE CONCAVE MOLD | | | | | |
|---|---|---|---|---|---|---|---|---|
| POWER | PLANO | +0.25 | +0.50 | +0.75 | +1.00 | +1.25 | +1.50 | +1.75 | +2.00 |
| CONVEX MOLD | 5.00–0.00 | 4.75–0.00 | 4.50–0.00 | 4.25–0.00 | 4.00–0.00 | 3.75–0.00 | 3.50–0.00 | 3.25–0.00 | 3.00–0.00 |

| | 7 BASE CONCAVE MOLD | | | | | | | |
|---|---|---|---|---|---|---|---|---|
| POWER | +2.25 | +2.50 | +2.75 | +3.00 | +3.25 | +3.50 | +3.75 | +4.00 |
| CONVEX MOLD | 4.75–0.00 | 4.50–0.00 | 4.25–0.00 | 4.00–0.00 | 3.75–0.00 | 3.50–0.00 | 3.25–0.00 | 3.00–0.00 |

SPHERES MINUS POWERS

| | 5 BASE CONCAVE MOLD | | | | | | | |
|---|---|---|---|---|---|---|---|---|
| POWER | -0.25 | -0.50 | -0.75 | -1.00 | -1.25 | -1.50 | -1.75 | -2.00 |
| CONVEX MOLD | 5.25–0.00 | 5.50–0.00 | 5.75–0.00 | 6.00–0.00 | 6.25–0.00 | 6.50–0.00 | 6.75–0.00 | 7.00–0.00 |

| | 3 BASE CONCAVE MOLD | | | | | | | |
|---|---|---|---|---|---|---|---|---|
| POWER | -2.25 | -2.50 | -2.75 | -3.00 | -3.25 | -3.50 | -3.75 | -4.00 |
| CONVEX MOLD | 5.25–0.00 | 5.50–0.00 | 5.75–0.00 | 6.00–0.00 | 6.25–0.00 | 6.50–0.00 | 6.75–0.00 | 7.00–0.00 |

| | 1 BASE CONCAVE MOLD | | | | | | | |
|---|---|---|---|---|---|---|---|---|
| POWER | -4.25 | -4.50 | -4.75 | -5.00 | -5.25 | -5.50 | -5.75 | -6.00 |
| CONVEX MOLD | 5.25–0.00 | 5.50–0.00 | 5.75–0.00 | 6.00–0.00 | 6.25–0.00 | 6.50–0.00 | 6.75–0.00 | 7.00–0.00 |

FIG. 10D

FLOW CHART

Step 1
Select and install molds & preforms designated for that Rx. Use barcode for verification.

Step 2
Circulate through the system to verify that system. That system is "GO"

Step 3
Upon starting the machine, the top mold comes down & makes contact with the preform.

Step 4
The displacement of the top mold stops and hot air is introduced to preheat the molds and preforms.

Step 5
The top mold starts to compress the preform at a lower initial pressure.

Step 6
When 10 to 50% of the displacement is achieved, a second higher pressure kicks in.

Step 7
The compression molding continues until the center thickness of the Rx is obtained.

Step 8
Upon achieving the desired center thickness heating stops and molds lenses cool down

Step 9
At completion of cooling, top mold returns to home position and lens is free to be removed.

FIG. 11

METHOD FOR MAKING EYE GLASS LENSES AND PREFORMS FOR USE THEREIN

FIELD OF THE INVENTION

The field of the invention relates to the manufacture of eyeglass lenses and preforms and molds relating thereto.

BACKGROUND OF THE INVENTION

This improved invention relates to preform lens blanks, and to a method for making a lens, more particularly to a system embodying the cold flow compression molding of a lens between a pair of mold/cavities using a preformed lens blank of thermoplastic material, and of predetermined configuration. The system is particularly applicable for use in house by the optician, optometrist and/or ophthalmologist. Alternatively, the system can be used in a specialized lab. The method and apparatus do not require the use of skilled technicians, and reduces the cost of prescription lenses since they are created substantially defect free, eliminating the need for any middle men, such as a laboratory or lens factory. Moreover, the lens can be fabricated quickly in minutes, so that the patient or customer can be fitted with a pair of prescription glasses in virtually no time, and certainly less time than it takes for an eye examination.

SUMMARY OF THE INVENTION

According to the invention a method for forming a thermoplastic preform into a lens by compression molding between a pair of molds is provided. In one aspect of the invention a set of novel preforms made from a thermoplastic material is provided. The preforms have different radii of curvature. Preferably each different curvature preform comes in different weights desirably two or three different weights.

A series of mating concave and convex mold halves are provided for use with the preforms. According to the invention a limited number of concave mold halves are provided. A wide range of single vision and multifocal lenses can be supplied from three (3) to six (6) base curve concave mold halves having different radii of curvatures. According to the invention a first concave mold half with a radius of curvature of less than two (2) diopters is provided. Each successive concave mold half has a radius of curvature of from one (1) to three (3) diopters desirably about two (2) diopters greater than the previous mold half in the series.

Thermoplastic preforms are associated with the different concave mold halves. Each preform has a convex side for placement in a concave mold half and a flat side or substantially flat side or a concave curve side for engagement with a convex mold half The convex side of the preform has a radius of curvature in diopters of 1 to 5 diopters greater than the radius of curvature of the concave mold half. Desirably the radius of curvature of the preform is 2 to 4 diopters greater than the radius of curvature of the concave mold desirably about 3 diopters or above and preferably 3 diopters greater than that of the concave mold. A convex mold half is provided for mating with the concave mold to complete the finished lens having a desired magnification strength.

According to the invention one of the limited number of concave mold halves is selected depending on the desired prescription of the lens. The appropriate preform is also selected depending on the mold and prescription involved. The preform and mold are heated to a temperature above the softening point of the preform. Desirably the preform is placed in the concave mold half and preheated to a temperature above the softening temperature of the lens. The preform and the mold are placed in a press. The molds and the preform can be preheated before or after being placed in the press. After the molds and the preform have been heated above the softening point of the thermoplastic material of the preform, pressure is applied by the press. A central thickness of the lens is preselected, depending on the prescription. The press is operated to compress the lens to the preselected central thickness. Multiple stages or a single stage can be used. Desirably the press is operated in two stages. Desirable, in the first stage, about 10% to 50% of the desired displacement of the lens is achieved. In the second stage, additional pressure is applied until the preselected center thickness of the lens is achieved. After the lens has been suitably compression molded, the lens is cooled, edged, trimmed and coated as desired for use.

In another aspect of the invention, novel preforms are provided. According to the invention, a preform is provided having an indent on its flat or concave side. The indent centers the convex mold half during the compression process and prevents excess flash. The indent prevents incomplete lenses from forming and the lens from decentering. In another aspect of the invention, preforms are provided with locator arms attached to the periphery of the preform for mating engagement with the mold base used to hold the bottom mold. The locator arms align the preform in a preselected orientation to a concave mold located in the mold base. The locator arms prevent shifting of the lens after it has been oriented. Such shifting or decentering can result in unwanted introduction of prisms into the lenses and may result in erroneous stigmatism corrections or misplacement of the position of a bifocal.

The preferred embodiment of the present invention is illustrated in the drawings and examples. However, it should be expressly, understood that the present invention should not be limited solely to the illustrative embodiment.

BRIEF DESCRIPTION OF THE DRAWINGS

FIG. 10A is a chart showing an example of the weight distribution of finished lenses.

FIG. 10B is a chart showing an example of the weight of preforms used for a four (4) curvature preform system associated with four base curve concave molds according to the invention.

FIG. 10C is a chart showing cylinder convex mold curves associated with concave mold base curves to form a preselected prescription.

FIG. 10D is a chart showing spherial convex mold curves associated with concave mold base curves to form a preselected prescription.

FIG. 11 is a flow chart of an embodiment of applicant's method of compression molding according to the invention.

DETAILED DESCRIPTION OF THE INVENTION

Figure 1:
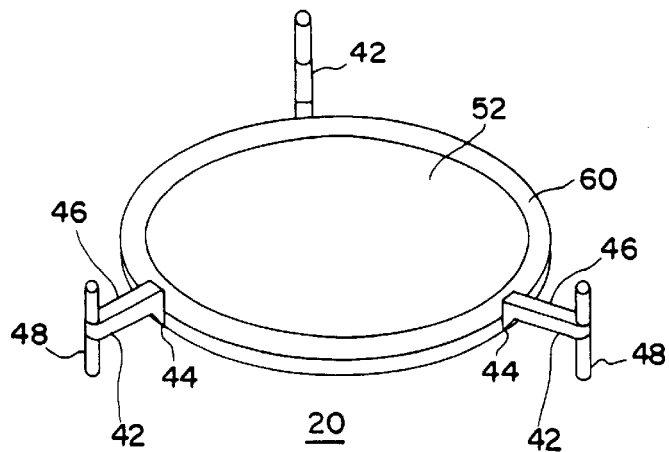
FIG. 1 is a perspective view of a preform according to the invention.

According to the invention a method for forming a thermoplastic preform into a lens by compression molding between a pair of molds is provided. In another aspect of the invention a set of novel preforms made from a thermoplastic material is provided. The preforms have different radii of curvature. Preferably each different curvature preform comes in different weights desirably two or three different weights.

A series of mating concave and convex mold halves are provided for use with the preforms. According to the invention a limited number of concave mold halves are provided. A wide range of single vision and multifocal lenses can be supplied from three to six base curve concave molds halves having different radii of curvatures. According to the invention a first concave mold half with a radius of curvature of less than two diopters is provided. Each successive concave mold half has a radius of curvature of from one to three diopters desirably about two diopters greater than the previous mold half in the series. Thermoplastic preforms are associated with the different concave mold halves. Each preform has a convex side for placement in a concave mold half and a flat or substantial flat or a concave side. Desirably, the preform has a flat or substantially flat side. Desirably, the thermoplastic is a thermoplastic resin material, polymethly/methacrylate, polycarbonates, polystyrene, cellulose acetate, acrylic copolymers, thermoplastic polyesters, styrene acrylonitrile (SAN), and/or mixtures thereof. A desirable thermoplastic material for use in the preform is an amorphis cyclo-olofin copolymer made from monomers of norborene followed hydrogenation for example Zeonor 1020 supplied by Zeon Chemical, Louisville, Ky.

The convex side of the preform has a radius of curvature in diopters of 1 to 5 diopters greater than the radius of curvature of the concave mold half. Desirably the radius of curvature of the preform is 2 to 4 diopters greater than the radius of curvature of the concave mold desirably about 3 diopters or above and preferably 3 diopters greater than that of the concave mold half.

A convex mold half is provided, for mating with the concave mold to complete the finished lens having a desired magnification strength. The convex mold half selected is dependent on the concave mold half selected and the prescription strength desired.

According to the invention one of the limited number of concave mold halves is selected depending on the desired prescription of the lens. The appropriate preform is also selected depending on the concave mold and prescription involved. A convex mold half is selected depending on the prescription. The preform and mold are heated to a temperature above the softening point of the preform. Desirably the preform is placed in the concave mold half and preheated to a temperature above the softening temperature of the thermoplastic material. The preform and the molds are placed in a press. The molds and the preform can be preheated above the softening temperature prior to placement in the press. Preferably the molds and the preform are heated in the press. After the molds and the preform have been heated above the softening point of the thermoplastic material of the preform, pressure is applied by the press. A central thickness of the lens is preselected, depending in part on the prescription and in part on the weight of the preform used. The press is operated to compress the preform to the preselected central thickness. Desirably the press is operated in two stages, although a single stage or multiple stages can be employed. Desirably, in the first stage, about 10% to 50% preferably about ⅓ of the desired displacement of the lens is achieved. In the second stage, additional pressure is applied until the preselected center thickness of the lens is achieved. After the lens has been suitably compression molded, the lens is cooled edged, trimmed and coated as desired for use.

In another aspect of the invention, novel preforms are provided. According to the invention, a preform having an indent on its flat side or concave side is provided. The indent centers the convex mold half during the compression process and prevents excess flash. The indent also prevents incomplete lenses from forming due to lack of center alignment of the preform with the convex mold. In another aspect of the invention, preforms are provided with locator arms attached to the periphery of the preform for engagement with the mold base used to hold the bottom mold. The locator arms align the preform in a preselected orientation with a concave mold sitting in the mold base. The locator arms prevent shifting of the lens after it has been oriented. Such shifting can result in unwanted introduction of prisms into the lenses and may result in erroneous stigmatism corrections or misplacement of the position of a bifocal.

Referring to FIG. 10B which is a chart showing desirable base curve preforms and weights used in the invention in conjunction with concave mold halves. In a preferred embodiment of the invention, it has been found that four (4) base curve concave molds can be used. If no-line bifocals are desired, the same four (4) base curves are used, however, power additions desirably nine (9) additions for each base curve are used for an additional thirty-six (36) molds to provide the bifocal lens. Separate molds are used for right and left lenses. Thus to provide both no-line bifocals and single vision lenses a total of about eighty (80) concave molds will be used. The number of mating convex molds to complete the lenses would desirably be about 153 to provide a full range of lenses to cover a wide range of prescriptions. See: FIGS. 10C and 10D.

The mating convex molds desirably include:

i. 64 cylinder molds for + cylinder lenses.
ii. 64 cylinder molds for − cylinder lenses.
iii. 8 cylinder molds for plano lenses.
iv. 9 sphere molds for + sphere lenses.
v. 8 sphere molds for − sphere lenses.

(See Table II for specific examples)

Note: These 153 molds will fill 377 prescriptions. This occurs because every 2 Dio of power the cc mold base curve changes 2 Dio. Therefore one can use the same series of cx molds again.

According to the invention, the number of different types of preforms blanks can also be limited. Preforms with a flat or substantially flat top and convex bottom are preferred. In the embodiment where four (4) different concave molds halves are used, a limited number of preforms can be used. The radius of the curvature of the preform for use in a mold is desirably 2 to 4 diopters greater than that of the concave mold preferably 3 diopters or greater and desirably about 3 diopters greater than that of the concave mold. Thus, where four (4) different base curves are used for the concave mold, four (4) different radii of curvature preforms are preferably used. In order to produce an acceptable lens, the mass of the preform needs to be sufficient to fill the mold cavity when the preform is mashed down during compression molding. FIG. 10B shows an example of a desirable range of preforms and base curve concave molds which allow one to make a full range of foci while manipulating the preselected central thickness up to about 0.5 mm for polycarbonate lenses. FIG. 10A shows the weight range of a 73 mm polycarbonate lenses with no adjustment of central thickness for a variety of prescription strength. It has been found that two (2) different weight preforms for each curve can be used. (See FIG. 10B) However, a single weight preform can be used for most applications and more than two (2) different weight preforms for each different curvature preform can also be used. Desirably three (3) or less different weight preforms, preferably two (2) different weights for each different curvature preform are used.

The weights of the preforms are chosen by weighing finished lenses. A test set of lenses are made in the molds using the preselected mold and a preform that supplies sufficient mass to make a complete lens having the preselected curvature. FIG. 10A, is a chart of weight distribution for lens foci. The weight of each lens is determined for each box in the chart. In FIG. 10B, four (4) base curvature convex lens blanks are referred to as I, II, III, IV. Two (2) different weight preforms are used for each base curve. Group I blanks have a radius of curvature of about eight (8) diopters and are used with a concave mold having a radius of curvature of about five (5) diopters. Group II blanks have a radius of curvature of about ten (10) diopters and are used with a concave mold having a radius of curvature of about seven (7) diopters. Group III blanks have a radius of curvature of about six (6) diopters and are used with a concave mold having a radius of curvature of about three (3) diopters. Group IV blanks have a radius of curvature of about four (4) diopters and are used with a concave mold having a radius of curvature of about one (1) diopter.

The top convex mold is selected to obtain a lens of the desired power. The lenses have a preselected diameter and a preselected central thickness . The finished lenses then are weighed for each power. It was found, for example, that the finished lenses in Group I weighed from 10.6 to 20.0 gm for a 73 mm polycarbonate lens. One could choose three (3) preforms for example, 13 gm, 16 gm, and 20 gm and supply sufficient mass to produce lenses in this group. Alternatively a preform of 20 grams could be used. However, a 20 gm preform could result in excessive flash in many instances.

According to the invention, it is preferred to minimize the number of blanks used with a specific concave mold while providing a blank that does not produce excess flash and has sufficient mass to fill the mold completely when heated and compressed. It has been found that by controlling thickness of the lens, two (2) different weight preforms can be advantageously used for each different curvature concave mold. In a preferred embodiment, four (4) different curvature concave molds are used and four (4) different curvature preforms are used. Desirably a total of eight (8) different preforms will be required. FIG. 10B is a chart showing an example of two (2) different weight preforms for each different curvature preform.

Generally, one manipulates the central thickness of the lens for different prescriptions and thereby reduce the number of preforms required. For plus lenses due to the geometric consideration of the mold, a central thickness for a 73 mm diameter polycarbonate lens of about 1.35 mm per diopter of power plus a desired edge thickness of about 1.0 mm is used. For minus lenses, a central thickness is preselected for all lenses for example, 1.0 to 1.5 mm is conventional for polycarbonate, 2.0 mm for tempered glass and CR39.

Figure 2:
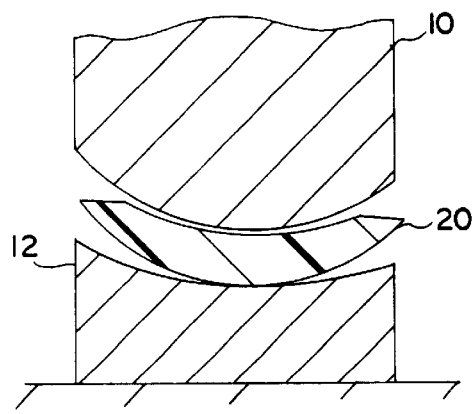
FIGS. 2 and 3 are vertical sections showing a pair of molds for use in the invention.
Figure 3:
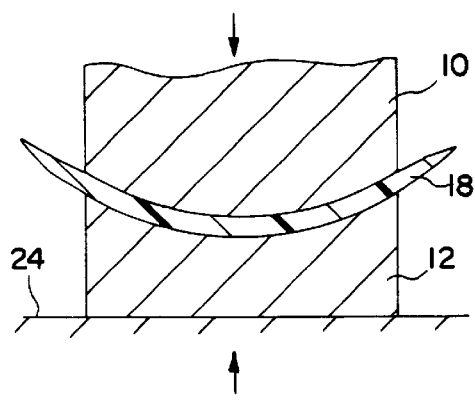

In order to be able to use a lighter preform, the central thickness of the heavier lenses can be reduced thereby requiring less mass. As shown in the chart in FIG. 10B, all of the lenses in group I can be made with two (2) thermoplastic preform desirably polycarbonate preforms. Desirably, an 12 g and 16 g blank are used, but different weight preforms can be used by varying the central thickness as desired and reducing the mass required for the finished lens. Generally, by varying the central thickness up to 0.5 mm from the standard thickness, two (2) preforms can be used to provide complete lenses without excessive flash for each different curvature preform. Thus, where a heavier preform appears to be required, a lighter preform can be used if the central thickness of the lens is lowered up to 0.5 mm until a lens that is completely formed is produced. FIG. 2 shows a preform placed in a mold prior to compression. FIG. 3 shows a mold containing a lens formed after compression molding.

According to the invention, when the lenses are made in a large laboratory, there is less of a concern about minimizing the number of lens blanks. Thus in a laboratory environment, one can conveniently provide a large number of different weight blanks since the volumes used are large. Thus, for example, as shown in FIG. 10A, the lenses of group I have a weight range of 10.6 to 20.0. You could have 9 preforms in 1 gm increments from 10 to 20 gm. which could cover all lenses without manipulating central thickness. See FIG. 10A.

In another aspect of the invention, a preform which is easier to align in the molds is provided. Referring to FIG. 1, a preform 20 having locator arms 42, desirably two (2) or more, preferably three (3) locator arms 42 is provided. The locator arms 42 are attached around the periphery of the preform 20. The locator arms 42 include a vertical extending member 44. A horizontal bar 46 is connected to member 44. At the distal end of the horizontally extending bar 46 is located a vertical post 48. The vertical extending member 44 is attached to the periphery of the preform and extends a sufficient vertical distance so that it clears the concave mold 12 in which it sits. The vertical distal end 48 is received by recesses 50 in mold base 24. When the preform 20 is placed in the concave mold 12, the locator arms 42 ensure proper orientation of the blank to be sure that the appropriate prescription, prism, and bifocal locations are correctly oriented.

Figure 4:
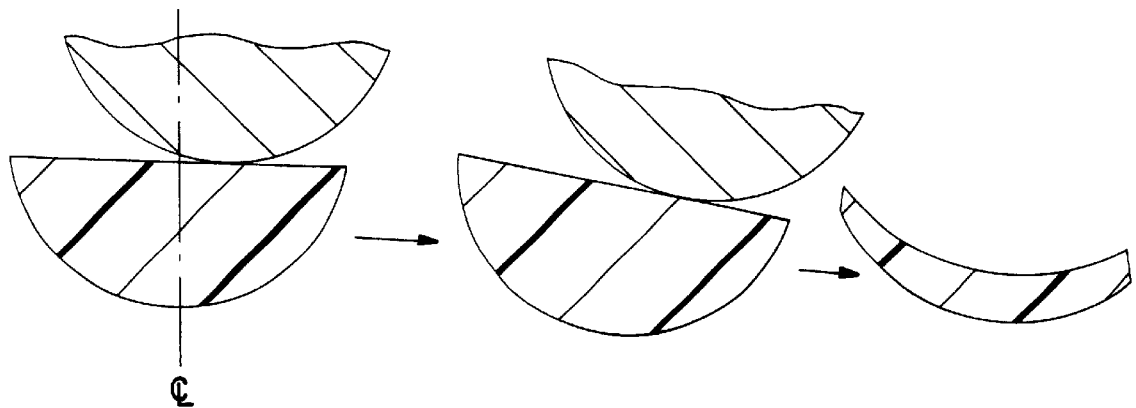
FIG. 4 is a perspective view showing the operation of a prior art mold and preform.
Figure 5:
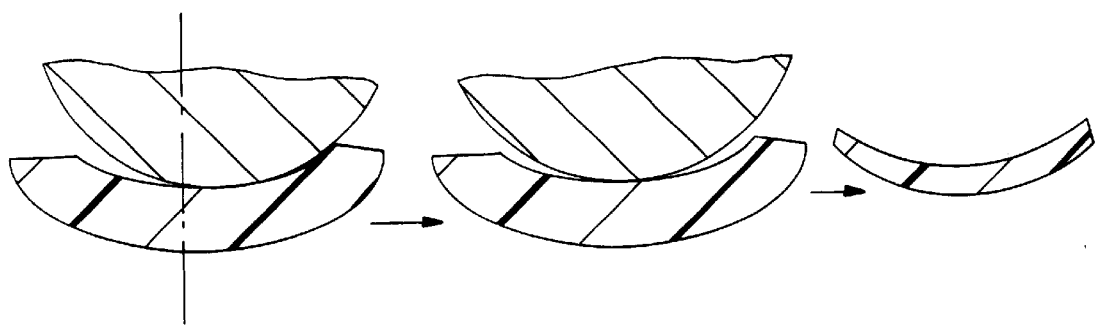
FIG. 5 is a perspective view showing the operation of a mold and preform according to the invention.
Figure 6:
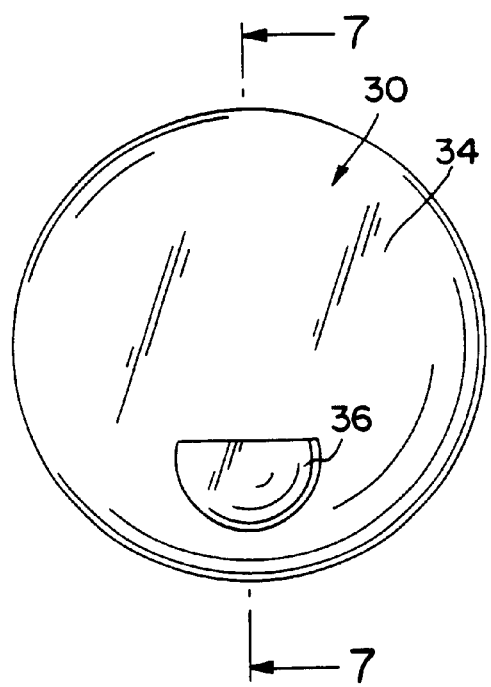
FIG. 6 is a typical bifocal lens made in accordance with the invention.
Figure 7:
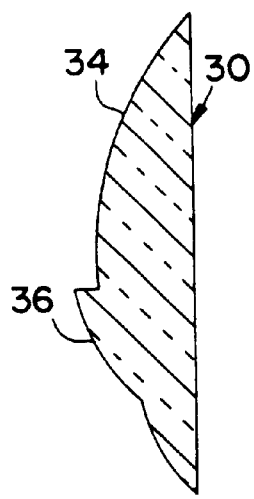
FIG. 7 is a cross sectional view of the lens of FIG. 6 along the section 6—6.
Figure 8:
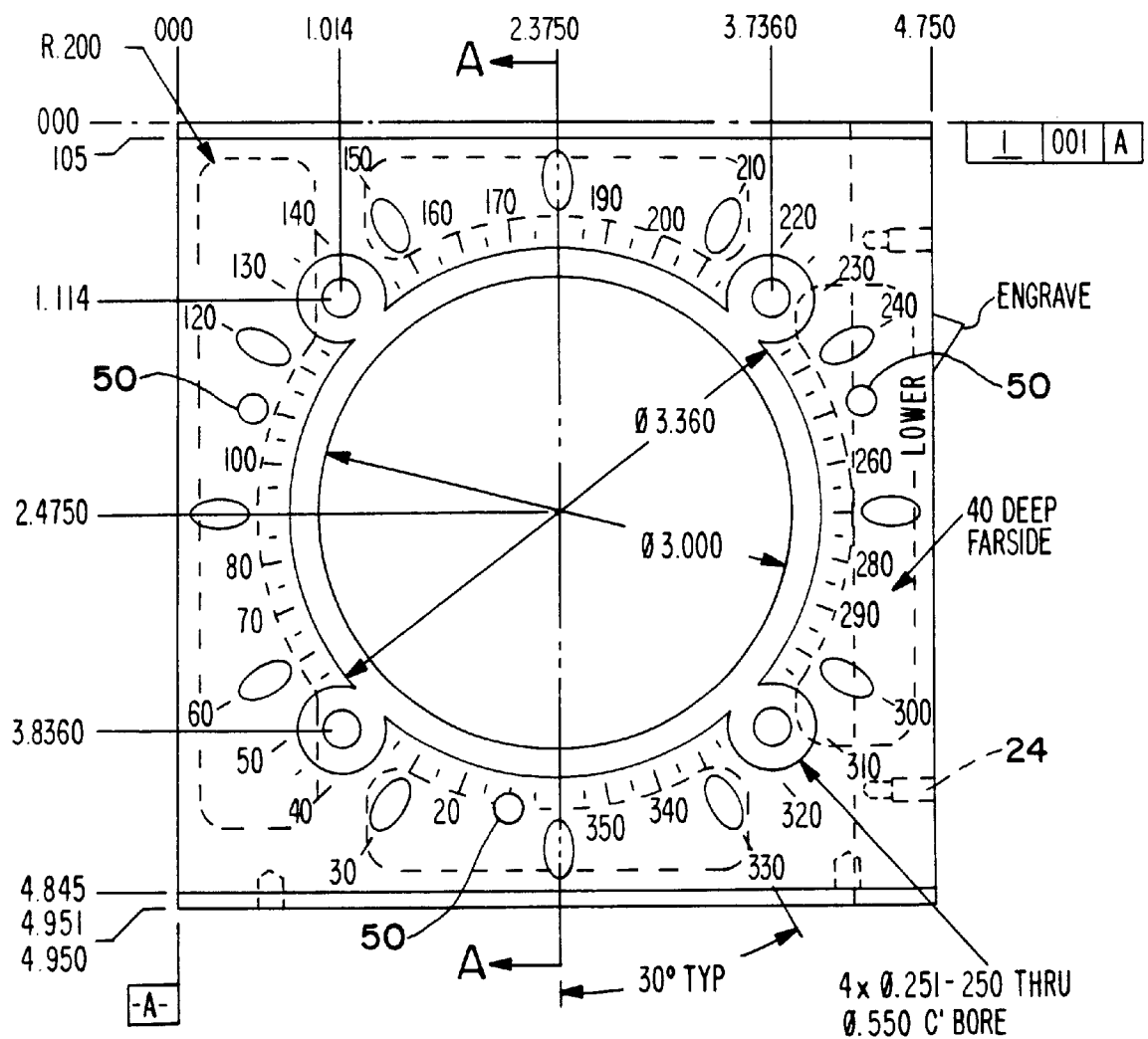
FIG. 8 is a mold base according to the invention.

In another aspect of the invention, the preforms include an indent 52 on the flat or concave side 60 of lens blank 20. The indent is useful in insuring that there is proper orientation with the top or convex half of the mold 10. During the compression molding cycle, it is possible that the convex mold half 10 will not come down directly dead center on the lens blank. As a result, as seen in FIG. 4, the convex mold 10 will be off center on the preform 19 which will result in an excessive flash at one end of the lens 17 and can result in an unintended prism in the lens. Thus, when the convex mold is brought down, the preform can rock and result in a bad lens. In accordance with the invention, the indent 52 helps self center the convex mold 10. As seen in FIG. 5, even if the indent is not lined up with the convex mold and the convex mold contacts the preform off center, the mold will seat itself in the recess. Then the preform shifts so that its aligned dead center. The result is that there is no excess flash and no undesired prism introduced into the lens 18.

In another aspect of the invention, the preform is made from an amorphous cyclo-olofin copolymer made from monomers of norbornene followed by hydrogenation. Particularly useful is Zeonor 1020 supplied by Zeon Chemicals, Inc. Lenses are made from Zeonor 1020 and have very desirable characteristics. The finished lenses are clear and water white in color and non-yellowing. Both CR39 and polycarbonate lenses, yellow, depending on temperature and time. The resulting lens also has a high index of refraction about 1.53 while less than polycarbonate at 1.58 is better than CR39 at 1.498. The resulting lens has a specific gravity of 1.0 which is 20% lighter than polycarbonate and 40% lighter than CR39. The Zeonor lens also has a high abbe number of 56. The lower the abbe number, the more bifringence that occurs. Polycarbonate has an abbe number of about 33. In addition, the lenses made from the norbornene monomers has a lower glass transition temperature and higher melt index than polycarbonate. Thus, the subject lenses can be compression molded at a lower temperature and higher speed than can polycarbonate. Additionally, the light transmission of the lenses is about 92%. Polycarbonate is only about 89%. Finally, the lenses made according to the invention with the Zeonor 1020, have extremely high impact resistance. The lenses have a very low specific gravity of about 1.0 making the lens extremely light. In fact, it is 20% lighter than polycarbonate and 40% lighter than CR39. When the Zeonor lens has been annealed which occurs during applicant's compression molding process, it has an impact resistance that is far superior to CR39 and approaches that of polycarbonate. See the test results of Table 1.

Figure 9:
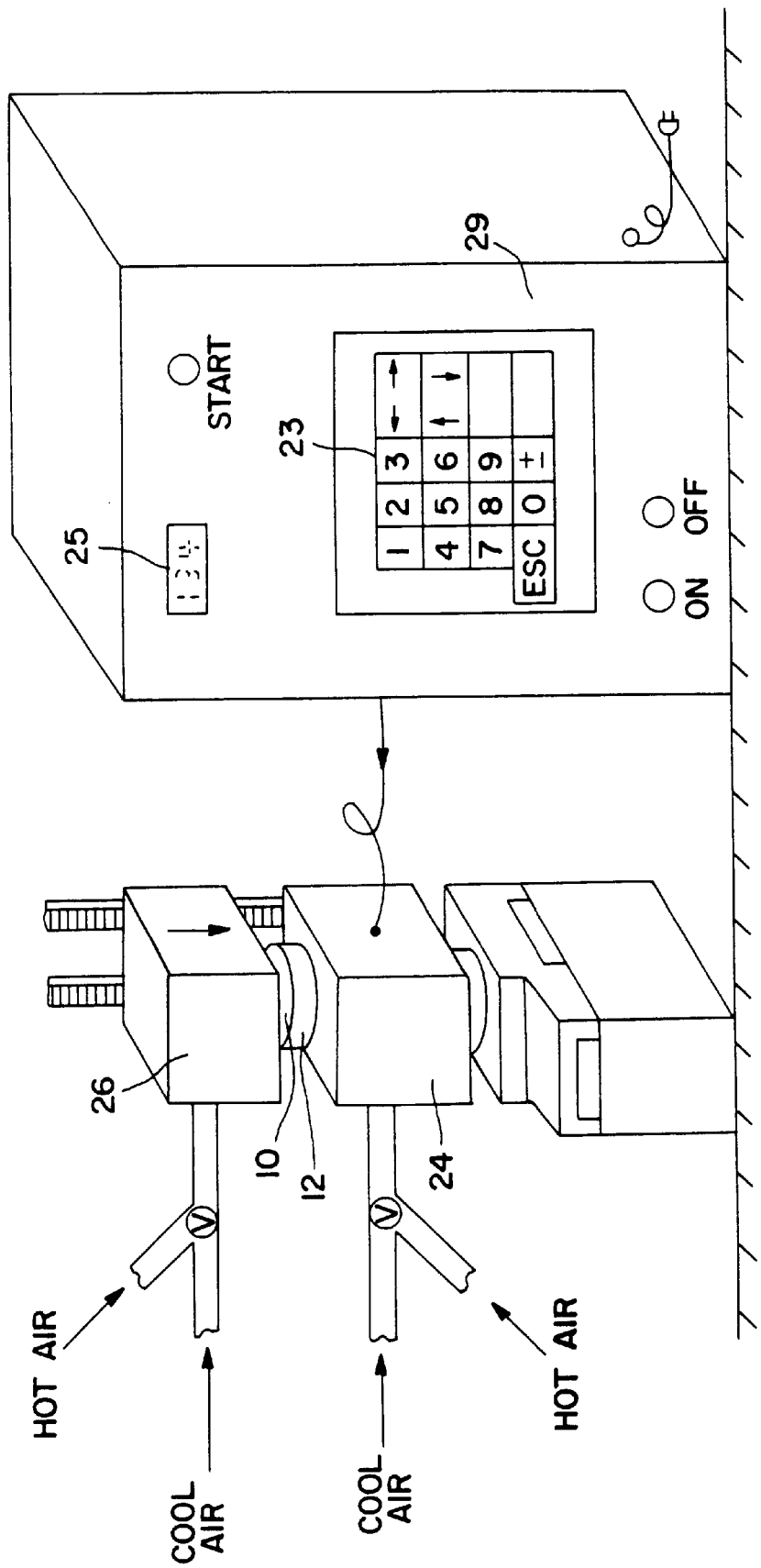
FIG. 9 is a diagrammatic illustration of a work station showing a pair of closed molds containing a preformed lens blank compressed to a finished form, and with an apparatus, and associated controls for heating up the molds, and for programming the rate of speed at which the upper mold descends on the preform to compress same to a desired finished lens.

A typical lens work station employing the apparatus for heating and pressing the preforms is best shown in FIG. 9. With the use of predetermined mold halves 10 and 12 for making a prescription lens, preforms having radii of curvature selected according to the invention are referenced to a standardized program for corrective lenses, and such corrective lenses would include those for decentration or prism/wedge effect (movement of optical center from geometric center), and other more specialized prescriptions. The user of the method thus selects the desired thermoplastic lens material, and the specified preform lens blank required and suitably places the predetermined mold halves offset with prism rings in the base mold mounts. Once the molds are centered with respect to each other, the preform is then positioned. Desirably, the preform has locator arms for engagement in the base 24 to ensure proper orientation. See FIG. 1. Once the molds and preform are preheated, and the machine is set up with the preform in place, and the predetermined given parameters set, the method cycle commences by pressing the start button. A central thickness for each prescription has been programmed in the computer. Within a few minutes, the two (2) step process is complete and the molds open for removal of the finished lens.

Thus, one can achieve with the novel method of the invention a finished ophthalmological lens as shown by the various method steps marked up on the flow chart of FIG. 11 for just about any type of corrective lens. The flow chart of FIG. 11 is believed to be self-explanatory and illustrates the various operative steps from top to bottom in order of their use in the practice of the method of the invention.

The lenses are formed very fast (virtually in a few minutes) and without any air bubbles or entrapped air due to the compression molding of the thermoplastic preform lens blank, and the finished fabricated lens can be immediately assembled (after an edge removal step which may be necessary should flashing be observed) into an eyeglass frame for the patient without the need to set up a return date with the patient so that the finished lens may be placed in the eyeglass frame. Generally, only about two (2) minutes are required to bring the upper mold down all the way, and about one-half minute for cooling the finished lens.

It is important with the improved method of the invention to utilize a moldable thermoplastic material which can be heated and squeezed into the required shape. On average, a typical lens made by the improved method of the invention can be made in a very short time.

Any type of lens can be fabricated by the improved method of the invention. In this regard, the front and back molds form a set for any desired lens configuration or prescription as well as lens size, (i.e. 75 mm diameter). As discussed above, the number of concave molds are limited. There can be from three (3) to six (6) base curve molds with a base curve convex preform associated with each. Once the concave mold is selected, the convex mold is determined for the prescription. (See Table II for examples)

The molds may be made of highly tempered glass, Pyrex glass, or preferably, of metal. They contain curves of different radii ground and polished into their smooth optical surfaces. Both molds need not necessarily be of the same material. In addition, the different curves of radii in a surface produce the corrective "power" to the finished lens formed by a mold set (be it a bifocal or trifocal, etc.). The edges remain unfinished and must be trimmed or ground down to the lens diameter or size required to fit the eye cutouts of a frame. Also, the two (2) molds may be suitably spaced apart according to the edge thickness desired. There is also no need for any type of gasketing means to stop the flow material from slipping out from between the molds, as is required in casting of lenses using well-known conventional processes.

The lenses made by the present invention are compression molded and suitable calibrating means which are well-known to those skilled in the art are used to form whatever decentration the lens is required to have along with the desired optical quality surfaces and powers prescribed. Once a lens is fabricated and removed from the molds, only the edge flashing need be removed, and this can be done after tinting and/or a hardness coating is applied. With the improved method of the invention, grinding and polishing of the optical surfaces is eliminated. It will be appreciated that the scratch resistant coatings can be applied either before, during or after molding, and to one or both sides of a lens, and that many such coatings comprise a base of silica. Some of such coating materials are available from the following manufacturers and/or suppliers. These are identified herein below as SHRES MSE 100 by Walker Silicone of Adrian, Mich; SHC-130-13 or HT 470 D or, SHC-NT 50 by Lens Technology of Ceritos, Calif. HT 450 by Coburn Company of Muskogee, Oakla.; UVHC 8555 by General Electric of Waterford, N.Y.; HC-8H by Fastcast of East Meadow, N.Y.; and HP-92 by GM Nameplate of Seattle, Wash.

During the method of compression forming the lens, no air bubbles or entrapped air of any kind are formed in the lens. Any such lens would be defective if it included air bubbles or entrapped air. The preform or lens blank and molds, are preferably preheated above the softening temperature of the thermoplastic lens preform. Optionally, subsequent continued heating can be applied. The compression molding of the inventive method forms the lens without the formation of air bubbles or entrapped air in the lens.

TABLE 1

IMPACT RESISTANCE

"Ball" Drop Testing using a pointed weight (ê)
Tested CR39, Tempered glass, Polycarbonate, and Zeonor 1020 by impacting the different lens materials from a height of 96" with increasingly heavy weights (maximum 320 g.) until failure. (Failure is represented by a shattering of the lens or having a hole punched through the concave surface. Both Polycarbonate and Zeonor did not fail; however they did indent. Recorded below is the failure weight or the depth of the indent.
The less the indent, the more impact resistant is the material. Additionally the material was prepared by subjecting it to different environmental conditions to determine an effect if any.

WEIGHT AT WHICH FAILURE OCCURRED, OR DEPT OF INDENT AT 320 GRAMS:

| MATERIAL TESTED | CONDITIONS UNDER WHICH SPECIMENS WERE PREPARED: | | | | | |
|---|---|---|---|---|---|---|
| | RT Air | RT Water | Hot Air 250° | Hot (212°) Water | Freezer 5° F. | Ice Water |
| CR39 | 144 g | 113 g | 144 g | 113 g | 133 g | 113 g |
| Tempered Glass | 152 g | 152 g | 152 g | 152 g | 152 g | 152 g |
| Polycarbonate | .040" indent | .041" indent | .100" indent | .074" indent | .019" indent | .020" indent |
| Zeonor 1020 | .085" indent | .058" indent | .178" indent | .139" indent | .040" indent | .087" indent |

TABLE 2

EXAMPLES OF Rx vs. MOLD & PREFORM REQUIREMENTS

| # | Rx | cc mold | cx mold | Preform Base Curve cx surface | Preform Base Curve cx surface | weight |
|---|---|---|---|---|---|---|
| 1 | −3.50−0.50 cyl | 3 base | 6.44−0.50 cyl | 5.00 Diop. | 3.00: 25 mm dia. recess | 21 g |
| 2 | −1.75−0.00 cyl | 5 base | 6.69−0.00 cyl | 8.00 Diop. | Flat | 16 g |
| 3 | +2.25−0.50 cyl | 7 base | 4.68−0.50 cyl | 10.00 Diop. | 3.00: 40 mm dia. recess | 18 g |
| 4 | +1.00−1.00 cyl | 5 base | 3.94−1.00 cyl | 8.00 Diop | Flat | 14 g |
| 5 | +0.50−0.50 cyl | 5 base | 4.43−0.50 cyl | 8.00 Diop | Flat | 11.5 g |
| 6 | −2.25−0.00 cyl | 3 base | 6.94−0.00 cyl | 6.00 Diop | Flat | 17 g |
| 7 | −4.25−2.00 cyl | 1 base | 5.18−2.00 cyl | 4.00 Diop. | 4.00: 75 mm dia. recess | 30 g |
| 8 | +4.00−1.50 cyl | 7 base | 2.95−1.50 cyl | 10.00 Diop. | Flat | 27 g |
| 9 | −6.00−0.75 cyl | 1 base | 6.94−0.75 cyl | 3.00 Diop. | 5.50 : 50 mm dia. recess | 33 g |

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A method of making an eye glass lens having a preselected prescription strength from a thermoplastic material comprising;
   selecting a concave mold half from a series of concave mold halves;
   said series of concave molds halves having three (3) to six (6) different radii of curvature;
   said series of concave mold halves comprising:
      a first concave mold half having a radius of curvature less than about 2 diopters;
      each different radius of curvature of said mold halves being 1 to 3 diopters greater than the radius of curvature of the concave mold half having the next lower radius of curvature;
   selecting a preform from a group of preforms having a convex bottom and a flat substantially flat, or concave top for use with said selected concave mold half;
   said group of preforms having the same number of different radii of curvature as said concave mold halves each different radii of curvature preform having from one (1) to three (3) different preselected weights;
   said group of preforms made from a thermoplastic material;
   said selected preform having a radius of curvature on said convex bottom of from 1 to 5 diopters greater than the radius of curvature of said selected concave mold half;
   selecting a convex mold half from a series of convex mold halves for mating with the selected concave mold half to form a lens of said preselected prescription strength;
   placing said selected preform in said concave mold halve;
   heating said selected preform said concave mold half and said convex mold half to a temperature above the softening temperature of said thermoplastic material;
   placing said mold halves in a press either before or after heating;
   closing said press and pushing said mold halves toward each other until said mold halves are a preselected distance apart to form a lens having a preselected center thickness; said center thickness variable depending on prescription strength and the weight of the selected preform.

2. A method of making an eye glass lens according to claim 1 wherein said selected preform has a radius of curvature on said convex bottom of from about 2 to 4 diopters greater than the radius of curvature of said selected concave mold half.

3. A method of making an eye glass lens according to claim 2 wherein said selected preform has a radius of curvature of about 3 diopters greater than the radius of curvature of said selected concave mold half.

4. A method of making an eye glass lens according to claim 3 wherein the preselected number of different radii of curvature of said concave mold halves is 4.

5. A method of making an eye glass lens according to claim 4 wherein said group of preforms includes four different radii of curvature preforms, each different radius of curvature having two weights, said weights selected to provide sufficient mass to fill said molds when said preform has been heated and compressed.

6. A method of making an eye glass lens according to claim 1 wherein said preselected center thickness is lower than a standard center thickness for some prescription lenses so that a preform having a lower weight can be used to supply sufficient mass to fill said molds.

7. The method according to claim 6 wherein said preselected center thickness is lowered up to 0.5 mm.

8. The method according to claim 1 where said thermoplastic material is amorphous cycloolefin copolymers of norbornene monomers followed by hydrogenation.

9. A method of making a lens having a preselected prescription strength from a thermoplastic material comprising;

selecting a concave mold from a series of concave mold halves;

said series of concave molds halves having a preselected radius of curvature;

said series of concave mold halves comprising:
 a first concave mold half having a preselected radius of curvature less than about 2 diopters;
 a second concave mold half having a radius of curvature of about 2 diopters greater than that of said first concave mold half;
 a third concave mold half having a radius of curvature about 2 diopters greater than said second concave mold half;
 a fourth concave mold half having a radius of curvature about 2 diopters greater than said third concave mold half;

selecting a preform from a group. of preforms having a convex bottom and a flat or substantially flat top;

said group of preforms made from a thermoplastic material comprising:
 a first curvature preform for use in said first concave mold half; said first curvature preform having a radius of curvature on said convex bottom about three diopters greater than the radius of curvature of the first concave mold half;
 a second curvature preform for use in said second concave mold half; said second curvature preform having a radius of curvature about three diopters greater than the radius of curvature of the second concave mold half;
 a third curvature preform for use in said third concave mold half; said third curvature preform having a radius of curvature about three diopters greater than the radius of curvature of the third concave mold half;
 a fourth curvature preform for use in said fourth concave mold half; said fourth curvature preform having a radius of curvature about three diopters greater than the radius of curvature of the fourth concave mold half;

selecting a convex mold half from a series of convex mold halves for mating with the selected concave mold half;

placing said preselected preform between said concave and said convex mold halves;

heating said selected preform and said mold halves to a temperature above the softening temperature of said thermoplastic material;

placing said molds in a press either before or after heating;

closing said press and pushing said molds toward each other until said molds are a preselected distance apart to form a lens having a preselected center thickness.

10. A method according to claim 9 further comprising each said first, second, third and fourth curvature preform having a first weight and a second weight;

said first and second weight being sufficient to provide sufficient mass to fill said mold when said preform has been heated and compressed.

* * * * *